United States Patent [19]

Abraham

[11] 4,168,943

[45] Sep. 25, 1979

[54] ARRANGEMENT FOR FEEDING ELASTOMERIC PARTICLES INTO AN EXTRUDER

[75] Inventor: John C. Abraham, Metamora, Ill.

[73] Assignee: Caterpillar Tractor Co., Peoria, Ill.

[21] Appl. No.: 889,178

[22] Filed: Mar. 23, 1978

Related U.S. Application Data

[63] Continuation of Ser. No. 560,064, Mar. 20, 1975, abandoned.

[51] Int. Cl.$^2$ ............................................. B29F 3/08
[52] U.S. Cl. ...................................... 425/205; 366/76; 425/379 R; 425/461
[58] Field of Search ...................... 264/176 R; 366/76; 198/671, 534, 529; 425/205, 376 R, 378 R, 461, 379 R

[56] References Cited

U.S. PATENT DOCUMENTS

| | | | |
|---|---|---|---|
| 2,061,042 | 11/1936 | Parkhurst | 425/379 |
| 3,387,331 | 6/1968 | Billings | 425/379 X |
| 3,997,646 | 12/1976 | Schneider et al. | 264/176 R |
| 4,014,462 | 3/1977 | Robertson | 366/76 X |

FOREIGN PATENT DOCUMENTS 1527351  5/1968  France ................................. 425/379 R Primary Examiner—Mark Rosenbaum
Attorney, Agent, or Firm—Phillips, Moore, Weissenberger, Lempio & Majestic

[57] ABSTRACT

The invention comprises an apparatus for the continuous extruding of a cohesive wire of a thermosetting elastomeric material at a temperature above the minimum curing temperature of said material from a particulate feed of said material in uncured form. The apparatus comprises a hollow generally horizontal cylinder, with a hole extending through an upper portion thereof and having a rotatingly powered screw longitudinally therewithin in close fitting relation to the inner wall thereof and adapted to force an elastomeric material towards one end of said cylinder. The apparatus includes means for controlling the temperature of said powered screw. A feed conduit is included extending generally upwardly from the hole. There is also provided a driven screw within the conduit in spaced apart relation from the inner wall thereof, the screw being driven in a direction to feed said elastomeric material generally upwardly away from said hole. The apparatus further includes an orifice adjacent said one end of said cylinder through which a cohesive wire of said elastomeric material is forced by action of said powered screw.

9 Claims, 5 Drawing Figures

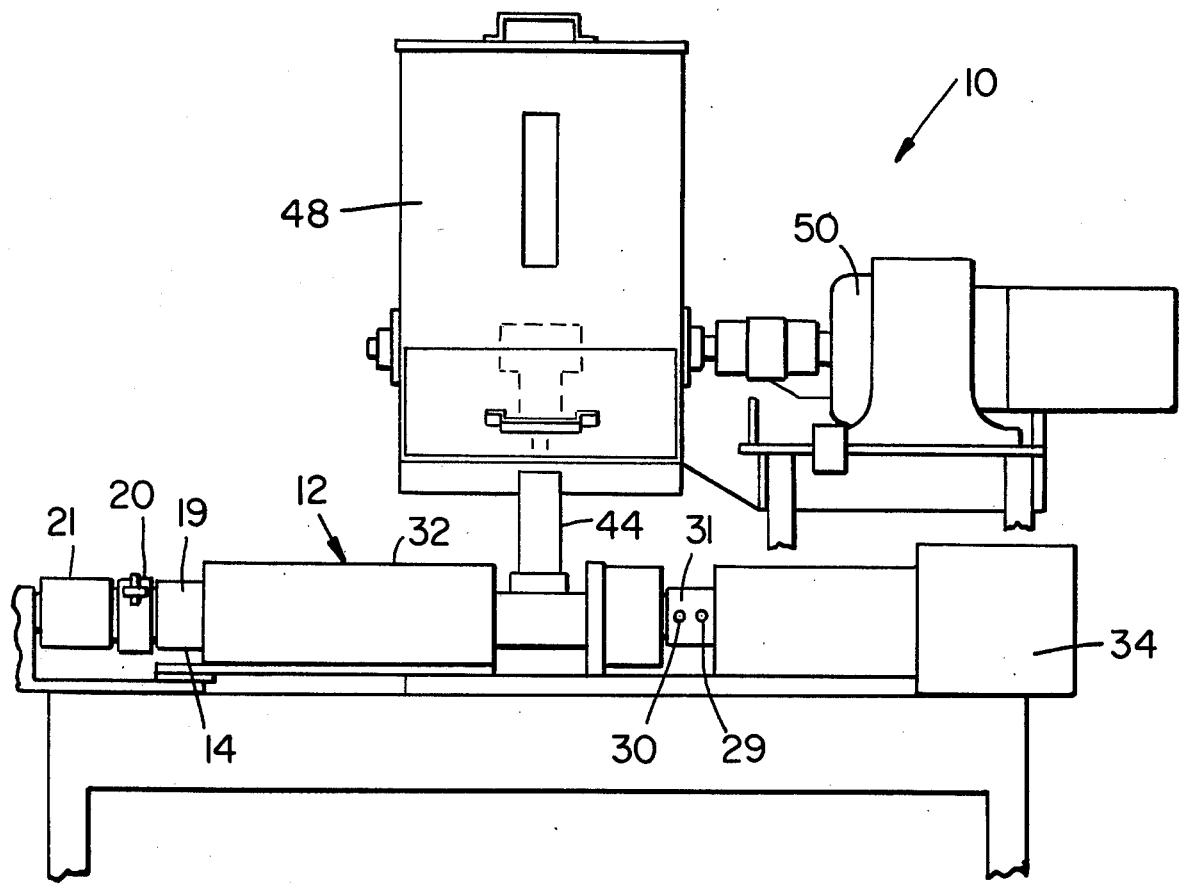
FIG_1
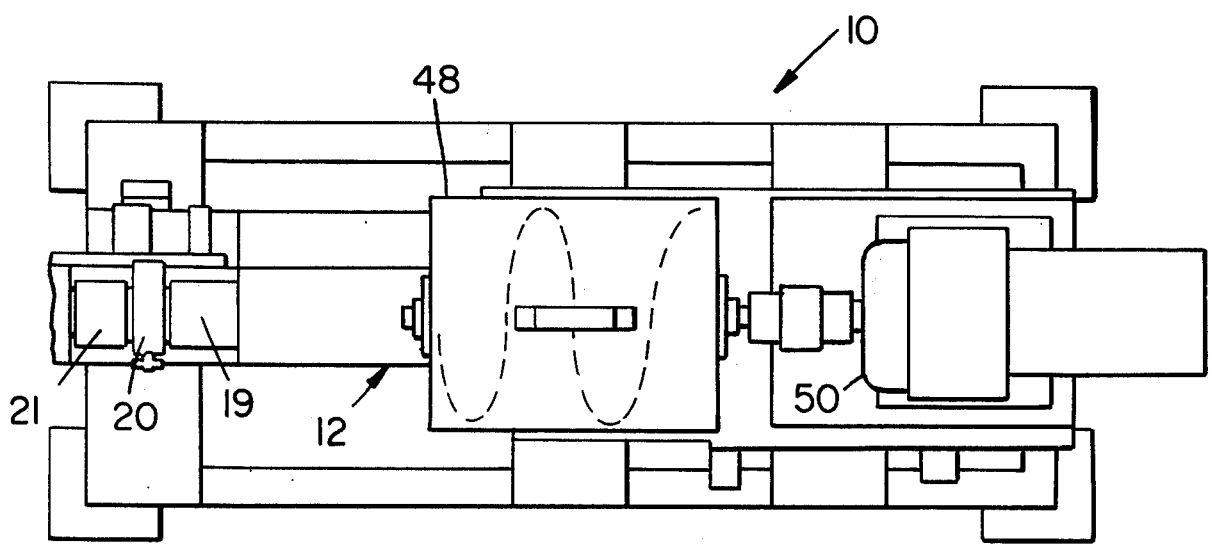
FIG_2

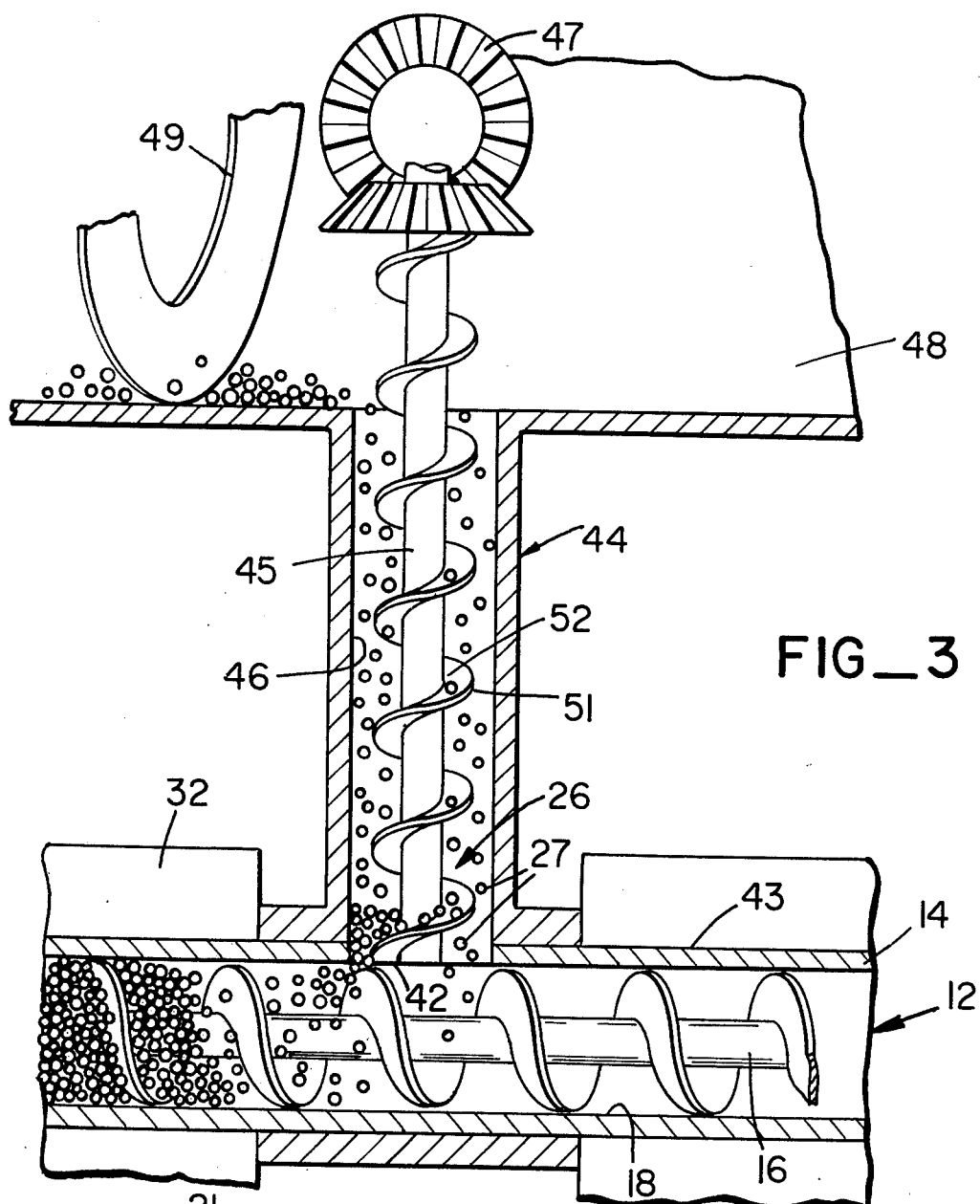
FIG_3
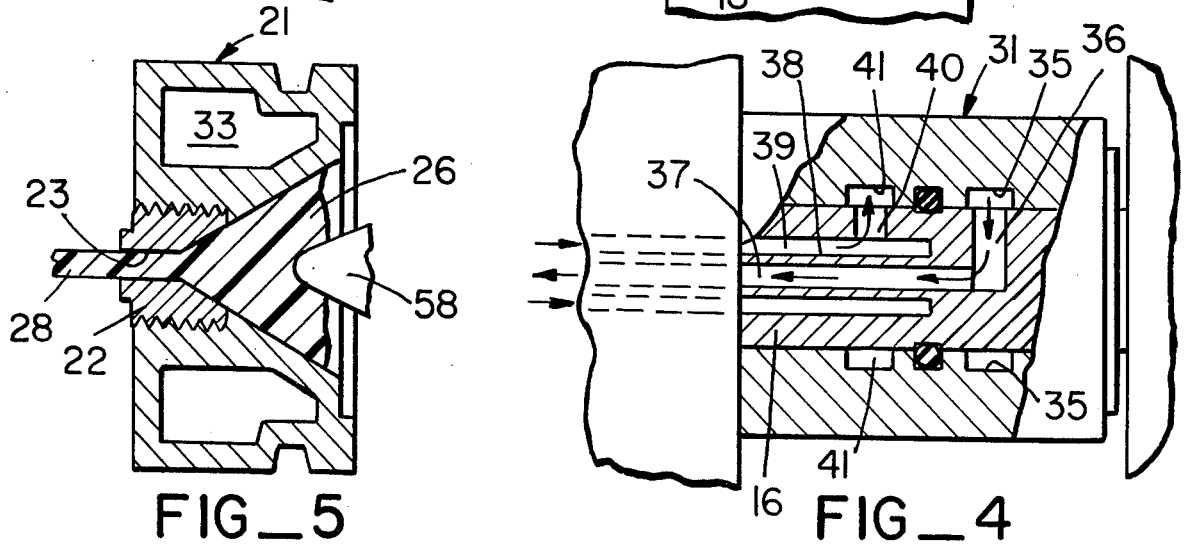
FIG_5  FIG_4

ARRANGEMENT FOR FEEDING ELASTOMERIC PARTICLES INTO AN EXTRUDER

This is a continuation of Ser. No. 560,064, filed Mar. 20, 1975, now abandoned.

BACKGROUND OF THE INVENTION

1. Field of the Invention

The invention relates to the continuous extruding of a cohesive wire of a thermosetting elastomeric material at a temperature above the minimum curing temperature of the material from a particulate feed of said material in uncured form.

2. Prior Art

The feeding of particulate material through a screw-type grinder/blender to form one or more wires of blended material is well known. With certain material, however, and more particularly with thermosetting elastomeric materials when it is desirable for one reason or another to extrude a cohesive wire of said elastomeric material at a temperature above the minimum curing temperature thereof, serious problems are encountered in using a common screw-type extruding apparatus. In particular, when the wire of elastomeric material to be extruded is to be extruded at a temperature above the minimum curing temperature of the particular elastomer being extruded, problems often arise of clogging within the screw-type extruder caused by premature curing of the elastomer. Such problems are met, for example, when the material being extruded comprises a copolymer of hexafluoropropylene and polyvinylidene fluoride. Yet it is highly desirable in many instances to have the wire of elastomer be at or above the minimum curing temperature therefor when it is extruded so that, for example, the wire can in a continuous operation be quickly shaped as in a mold and uniformly cured into a desired shape. Further, the particulate elastomer fed into the extruding apparatus must be at, or heated within the apparatus to, a temperature high enough so that it will soften and meld into a continuous medium if a uniform cohesive wire of the elastomer is to be formed.

The present invention provides a unique and useful apparatus for the continuous extruding of a cohesive wire of a thermosetting elastomeric material at a temperature above the minimum curing temperature thereof starting with a particulate feed, and wherein clogging of the screw-type extruder portion of the apparatus is eliminated or at least minimized.

SUMMARY OF THE INVENTION

Briefly, the invention comprises an apparatus for the continuous extruding of a cohesive wire of a material from a particulate feed of said material. The apparatus includes a hollow generally horizontal cylinder with a hole extending through an upper portion thereof and having a rotatingly powered screw longitudinally therewithin in close fitting relation to the inner wall of said cylinder and adapted to force an elastomeric material towards one end of said cylinder. A feed conduit extends generally upwardly from the hole. There is provided within the conduit a driven screw in spaced apart relation from the inner wall of the conduit, the screw being driven in a direction to feed the elastomeric material generally upwardly away from the hole. An orifice is provided adjacent the one end of the cylinder through which a cohesive wire of the elastomeric material is forced by action of the powered screw.

BRIEF DESCRIPTION OF THE DRAWINGS

FIG. 1 illustrates in side view an apparatus produced in accordance with the preferred embodiment of the present invention.

FIG. 2 illustrates in top view the apparatus illustrated in FIG. 1.

FIG. 3 illustrates in partial side section the portion of the apparatus of the present invention which serves to control the feed of particulate elastomeric material into the hollow horizontal cylinder of the preferred embodiment of the invention.

FIG. 4 illustrates in partial side section the means for controlling the temperature of the powered screw of the preferred embodiment of the invention.

FIG. 5 illustrates in partial side section the temperature controlled orifice of the preferred embodiment of the invention.

DETAILED DESCRIPTION OF THE PREFERRED EMBODIMENT

The invention will be better understood by reference to the drawings which illustrate a preferred embodiment of the invention, and wherein like numbers denote like parts throughout.

The preferred embodiment of the apparatus of the present invention for the continuous extruding of a cohesive wire of a thermosetting elastomeric material is indicated generally by the numeral 10. The apparatus includes an extruder portion 12 which includes a hollow generally horizontal cylinder 14 with a powered extruder screw 16 in close fitting relation to the inner wall 18 of the hollow cylinder 14. Attachable to the one end 19 of the hollow cylinder 14 via a clamping means 20 is a nozzle assembly 21 including a replaceable nozzle tip 22 having an orifice 23 therethrough. As elastomeric material 26 in the form of particles 27 is forced by the powered extruder screw 16 towards the one end 19 of the hollow cylinder 14 and out of the orifice 23 the material 26 is compacted together and blended so that the material extruded from the orifice 23 is in the form of a cohesive wire 28. Different size orifices 23 can be provided by simply changing nozzle tips 22. The replaceability of the nozzle tip 22 also aids in cleaning out the nozzle assembly 21 and in replacing abraded and worn nozzle tips 22.

The temperature of the thermosetting elastomeric material 26 is carefully controlled within the extruder portion 12 to be high enough to assure sufficient softening thereof to form a homogeneous cohesive wire yet to be low enough so that sufficient polymerization or setting does not take place to cause clogging. The temperature controlling is accomplished by controlling the temperature of the powered extruder screw 16 as by passing hot water or steam therethrough via an inlet port 29 and an exit port 30, in a block 31 as illustrated most clearly in FIGS. 1 and 4. The temperature is further controlled by a jacket 32 about the hollow cylinder 14 through which hot water, steam or the like is passed in a controlled manner.

The temperature of the elastomeric material 26 within the nozzle assembly 21 is also carefully and independently controlled by passing hot water or steam through the passage 33. Because of the direct screwing of the nozzle tip 22 into the nozzle assembly 21, the temperature of the nozzle tip 22 is also controlled by the temperature of the hot water or steam within the passage 33. Thus the temperature of the elastomeric material 26 is controlled precisely at the orifice 23 after said elastomeric material has passed through the entire cylinder 14 and is more likely to prematurely polymerize. Accordingly, the temperature of the exiting wire 28 is thereby precisely controlled so as to be correct for immediate use.

The powered extruder screw 16 is motivated in a conventional manner as by a motor 34 which is driveningly coupled to the powered extruder screw 16. The temperature of the screw 16 is precisely and independently controlled by passing hot water, steam or the like into the inlet port 29, thence to the undercut 35, through the passage 36 to the central conduit 37, to the vicinity of the tip 58 of the screw 16, about the cylindrical baffle 38, back around the annular passage 39, to a point short of the passage 36, through the passage 40 to the undercut 41 and out the block 31 via the exit port 30. By directing the flow inwardly through the central conduit 37 and then outwardly through the annular passage 39, precise control of the temperature of the screw 16 adjacent the tip 58 thereof is assured. This is advantageous in that it allows precise temperature control of the elastomeric material 26 after said material has been passed through the entire cylinder 14 and is more likely to prematurely polymerize and clog the apparatus 10.

The hollow cylinder 14 includes a hole 42 extending through a top portion 43 thereof. A cylindrical feed conduit 44 extends generally upwardly from the hole 42. A driven screw 45 is provided within the feed conduit 44 in spaced apart relation from an inner wall 46 of the feed conduit 44. The driven screw 45 is driven by the mitre gear 47 in a direction to feed the elastomeric material 26 generally upwardly away from the hole 42. For example, in the case of a right-hand driven screw 45, said screw 45 is driven counter clockwise. This is in sharp contrast to prior art particulate feed apparatus wherein a driven screw such as 45 is driven in a direction to feed material generally downwardly towards a hole such as the hole 42.

Generally, a feed hopper 48 is provided above and communicating with the feed conduit 44 whereby particulate elastomeric material 26 is continuously supplied to said feed conduit 44 and therefrom to said hollow cylinder 14. An auger 49 is generally utilized within the feed hopper 48 to gently motivate the particles 27 of the elastomeric material 26 towards the feed conduit 44. Motivation of the auger 49 and of the mitre gear 47 is provided by the electric motor 50.

The separation distance between an outer edge 51 of the screw thread 52 and the inner wall of the feed conduit 44 is important as it relates to the size of the particles 27 of the elastomeric material 26. In particular, the distance between the outer edge 51 and the inner wall 46 of the feed contuit 44 must be at least as large as the largest average particle size or largest average particle diameter of the particles 27 so that the particles 27 can flow down along the inner wall 46 and can reach the powered extruder screw 16 via the hole 42. Also the particles 27 must be screened or otherwise sized prior to loading within the hopper 48 so that they are all of generally the same size. Generally it is preferred that the distance between the outer edge 51 of the screw thread 52 and the inner wall 46 of the feed conduit 44 be at least one and one half times the average particle size of the largest particles of the particles 27. Since the driven screw 45 is restricted to rotate only in such a direction as to carry the particles 27 upwardly and away from the hole 42, it is clear that the action of said driven screw 45 is to prevent undue clumping and too fast of a feed of the particles 27 into the hollow cylinder 14 which could lead to clogging therewithin.

The means provided for controlling the temperature of the screw 16, namely the inlet port 29 and the outlet port 30 which lead to the screw 16, in combination with the jacket 32 for controlling the temperature of the hollow cylinder 14, allow the temperature of the elastomeric material 26 to be controlled within the cylinder 14 as it is propelled towards the orifice 23 and throughout the extrusion operation. Thus, local overheating is prevented whereby clogging of the elastomeric material 26 within the hollow cylinder 14 is prevented. Meanwhile the temperature is properly maintained to be high enough so that some crosslinking of the elastomer occurs thus assuring the formation of a cohesive wire 28. Since the temperatures of the screw 16, the jacket 32 and the nozzle assembly 21 are each independently controlled, the temperature profile within the apparatus 10 can be selected in a desired manner. In general, the temperature of the nozzle assembly 21 is adjusted to be less than that of the jacket 32 and the screw 16, usually by about 5° to 10° C.

In the particularly preferred embodiment of the invention, the elastomeric material to be extruded comprises a thermosetting elastomeric material and more particularly comprises a fluoroelastomer such as, for example, a polyvinylidene polymer such as a copolymer of hexafluoropropylene and polyvinylidene fluoride which is commercially available and known variously as Viton E60, E60C and LD 2873 (E. I. du Pont de Nemours and Company, Wilmington, Del.) and Fluorel 2160, 2170 and FC 2170 (3M Company, St. Paul, Minn.). Since fluoroelastomers are often sold in rather large chunks and since even fluoroelastomer originally shipped in small particles form agglomerates somewhat on storage and/or shipment, it is generally necessary to provide means for reducing the chunks or agglomerates to a small, say e.g. 5 mm diameter, size prior to introduction thereof into the feed conduit 44. When such a copolymer is extruded it is generally desirable to have the elastomeric material 26 stay at a temperature no more than about 110° C. and preferably no more than about 105° C. It is further desirable that the temperature of the elastomeric material 26 during its sojourn through the hollow cylinder 14 is at least about 80° C. and more preferably at least about 85° C. so that it will soften to form a cohesive wire and also can quickly be heated to a fast curing temperature on emergence from the orifice 23. Further it is highly desirable that the average time of the elastomeric material 26 within the hollow cylinder 14 be restricted to no more than about five minutes and more preferably no more than about three minutes to prevent excessive curing of the material within the cylinder 14 with concurrent clogging of the extruder portion 12.

As will be seen with reference to the figures, the driven screw 45 preferably ends in close proximity to the powered extruder screw 16. This insures effective stirring and lifting of the particulate feed and thereby greatly lessens the possibility of clogging.

In the most preferred embodiment of the invention, it is preferred for acceptable feed rates that the maximum diameter of the driven screw 45 and more particularly the outer diameter of the screw thread 52 (the diameter at the outer edge 51) is at least one half the internal diameter of the feed conduit 44. Further it is preferred that the separation between the outer edge 51 of the screw thread 52 and the inner wall 46 of the feed conduit 44 be at least one and one half times the particle size of the largest of the particles 27. When these dimensional characteristics are observed, clog free operation of the entire extruding apparatus results.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:

1. An apparatus for the continuous extruding of a cohesive wire of a thermosetting elastomeric material at a temperature above the minimum curing temperature of said material from a particulate feed of said material in substantially unpolymerized form, comprising:
   a hollow generally horizontal cylinder with a hole extending through a top portion thereof;
   a rotatingly powered screw longitudinally within said cylinder in close fitting relation to the inner wall of said cylinder and adapted to force an elastomeric material towards one end of said cylinder;
   a nozzle assembly including an orifice adjacent said one end of said cylinder through which a cohesive wire of said elastomeric material is forced by action of said powered screw;
   a feed conduit extending generally upwardly from said hole;
   means controlling the temperature of said powered screw;
   means adjacent to said orifice for controlling the temperature of said orifice;
   a screw within said conduit in spaced apart relation from the inner wall thereof; and
   means driving said screw in a direction to feed said elastomeric material generally upwardly away from said hole.

2. An apparatus as in claim 1 including means for controlling the temperature of said hollow cylinder.

3. An apparatus as in claim 2 including a feed hopper communicating with the top of said feed conduit.

4. An apparatus as in claim 3, wherein an outer edge of the screw thread of said driven screw is spaced apart from the inner wall of said conduit a distance at least equal to the maximum size of the particles of said particulate feed.

5. An apparatus as in claim 4, wherein the distance between said outer edge of said screw thread and said inner wall of said feed conduit is at least one and one half times the size of the largest particles of said particulate feed.

6. An apparatus as in claim 5, wherein the outer diameter of said screw thread is at least one half the inner diameter of said feed conduit.

7. An apparatus as in claim 6, wherein said means for controlling the temperature of said powered screw comprises a block having a bore therethrough through which said powered screw passes in rotating relation; an inlet port communicating the exterior of said block with a first undercut in said bore, a first passage communicating said first undercut with a central conduit within said bore, an annular channel communicating adjacent a tip end of the powered screw with said central conduit said annular channel ending short of said first passage, a second passage communicating said annular channel with said bore, a second undercut in said bore at an end of said second passage removed from said annular channel, an exit port communicating the exterior of said block with said second undercut and means for directing a fluid of controlled temperature into said inlet port and out of said exit port.

8. An apparatus as in claim 7, wherein said orifice is replaceably attached to said nozzle assembly.

9. An apparatus for the continuous extruding of a cohesive wire of a material from a particulate feed of said material, comprising:
   a hollow generally horizontal cylinder with a hole extending through a top portion thereof;
   a rotatingly powered screw longitudinally within said cylinder in close fitting relation to the inner wall of said cylinder and adapted to force an elastomeric material towards one end of said cylinder;
   a nozzle assembly including an orifice adjacent said one end of said cylinder through which a cohesive wire of said material is forced by the action of said powered screw;
   a feed conduit extending generally upwardly from said hole;
   a screw within said conduit in spaced apart relation from the inner wall thereof; and
   means driving said screw in a direction to feed said material generally upwardly away from said hole.

* * * * *